United States Patent
Oku et al.

(10) Patent No.: US 10,481,381 B2
(45) Date of Patent: Nov. 19, 2019

(54) LINE-OF-SIGHT DIRECTION CONTROL DEVICE

(71) Applicant: The University of Tokyo, Tokyo (JP)

(72) Inventors: Hiromasa Oku, Tokyo (JP); Masatoshi Ishikawa, Tokyo (JP); Koseki Kobayashi, Tokyo (JP)

(73) Assignee: The University of Tokyo, Tokyo (JP)

( * ) Notice: Subject to any disclaimer, the term of this patent is extended or adjusted under 35 U.S.C. 154(b) by 379 days.

(21) Appl. No.: 14/902,996

(22) PCT Filed: Jun. 25, 2014

(86) PCT No.: PCT/JP2014/066788
§ 371 (c)(1),
(2) Date: Jan. 5, 2016

(87) PCT Pub. No.: WO2015/002041
PCT Pub. Date: Jan. 8, 2015

(65) Prior Publication Data
US 2016/0161734 A1    Jun. 9, 2016

(30) Foreign Application Priority Data
Jul. 5, 2013 (JP) .................................. 2013-141940

(51) Int. Cl.
*G02B 23/14* (2006.01)
*H04N 5/225* (2006.01)
(Continued)

(52) U.S. Cl.
CPC ........... *G02B 23/14* (2013.01); *G02B 17/008* (2013.01); *G02B 26/0816* (2013.01);
(Continued)

(58) Field of Classification Search
CPC ............ G02B 26/0085; G02B 26/101; G02B 26/105; G02B 26/0841; G02B 26/0833;
(Continued)

(56) References Cited

U.S. PATENT DOCUMENTS

| 3,718,761 A * | 2/1973 | Myer ................. G06K 7/10871 |
| | | 235/462.39 |
| 6,245,590 B1 * | 6/2001 | Wine ................. G02B 26/0833 |
| | | 438/14 |

(Continued)

FOREIGN PATENT DOCUMENTS

| JP | 9-164331 A | 6/1997 |
| JP | 2005-323311 A | 11/2005 |

OTHER PUBLICATIONS

Aloimonos et al., "Active Vision," *International Journal of Computer Vision*, pp. 333-356, 1988.
(Continued)

*Primary Examiner* — Wen Huang
(74) *Attorney, Agent, or Firm* — Seed Intellectual Property Law Group LLP

(57) ABSTRACT

An object of the present invention is to widen a range in which line of sight change is possible, particularly in a pan direction. According to the present invention it is possible to acquire high line of sight changing speed. A pan mirror is capable of rotation in forward and reverse directions about a third rotational axis. Also, the third rotational axis extends in a direction that is substantially parallel to a line of sight direction directed from a tilt direction control section to the pan mirror. An angle α formed by the pan mirror and the third rotational axis is set in a range 0°<α<90°. The tilt direction control section can scan line of sight direction with respect to a virtual plane formed by a rotation locus of the pan mirror. The tilt direction control section can also control tilt angle of the line of sight direction from the pan mirror to
(Continued)

a physical object. The pan mirror can control pan angle of the line of sight direction from the pan mirror to the physical object by being rotated about the third rotational axis.

9 Claims, 6 Drawing Sheets

(51) Int. Cl.
*H04N 5/232* (2006.01)
*G03B 17/56* (2006.01)
*G02B 17/00* (2006.01)
*G02B 26/08* (2006.01)
*G02B 27/00* (2006.01)

(52) U.S. Cl.
CPC ....... *G02B 27/0012* (2013.01); *G03B 17/568* (2013.01); *H04N 5/225* (2013.01); *H04N 5/2259* (2013.01); *H04N 5/232* (2013.01)

(58) Field of Classification Search
CPC . G02B 26/0858; B81B 3/0083; B81B 3/0086; H04N 5/2259
See application file for complete search history.

(56) References Cited

U.S. PATENT DOCUMENTS

| | | | |
|---|---|---|---|
| 6,327,493 B1* | 12/2001 | Ozawa | A61B 5/0073 348/45 |
| 7,804,056 B2 | 9/2010 | Bishop | |
| 9,791,555 B2* | 10/2017 | Zhu | G01S 17/08 |

OTHER PUBLICATIONS

Okumura et al., "High-speed Gaze Controller for Millisecond-order Pan/tilt Camera," 2011 IEEE International Conference on Robotics and Automation, Shanghai International Conference Center, May 9-13, 2011, Shanghai, China, 6 pages.
International Search Report and Written Opinion, dated Sep. 30, 2014, for International Application No. PCT/JP2014/066788, 12 pages (with English Translation).
Okumura et al., "Optical Gaze Control System to Realize More High-speed Active Vision," *The Journal of the Robotics Society of Japan* 29(2):79-89, 2011 (with English Abstract).
Okumura et al., "Visual Measurement of a High-speed Flying Object using Saccade Mirror and Image Processing," *Proceedings of the 2011 JSME Conference on Robotics and Mechatronics*, Okayama, Japan, May 26-28, 2011, 4 pages. (with English Abstract).

* cited by examiner

LINE-OF-SIGHT DIRECTION CONTROL DEVICE

TECHNICAL FIELD

The present invention relates to technology for controlling a line of sight direction of an optical instrument.

BACKGROUND ART

In order to continuously shoot a subject, it is necessary to have a camera line of sight trained on an object. This task is often undertaken manually by the photographer, but it is difficult to perfectly track something like the bouncing of a ball that is high speed and has irregular movement. For this reason, research into systems for automatically controlling line of sight direction of a camera mechanically (so-called Active Vision: refer to non-patent publication 1 below) has become widespread in many fields.

With normal Active Vision technology, since the camera itself is moved while being attached to a drive platform, there is a delay in response speed with respect to movement in the line of sight direction. This makes tracking of a moving object that includes sudden acceleration changes (for example, a ball being used in a ball game) difficult. If the fact that the frame rate of a high speed camera reaches 1,000,000 fps in faster applications, and actual conditions where image processing is carried out at high speed by a GPU, are considered, it can be said that line of sight control speed is a bottleneck to the speed aspects in various tracking systems.

In order to solve this problem, an optical system known as a Saccade Mirror has been proposed, to carry out change of the line of sight of a camera at high speed using small drive mirrors arranged in front of a camera (refer to non-patent publication 2 below). With this technology, using two axis galvano mirrors makes high-speed line of sight change possible. Regarding a control system, if it were possible to control line of sight so as to always keep a physical object in the center of the screen, it can be considered that unprecedented dynamic shooting would become possible.

However, there is a problem in that pan angle and tilt angle are comparatively narrow with a conventional Saccade mirror.

As a device that can change line of sight in a wide angular range, the technology described in patent publication 1 below, for example, exists. With this technology, it is made possible to change line of sight direction in a wide range by changing mirror position using a so-called gimbal mechanism.

CITATION LIST

Patent Literature

[Patent Publication 1]
U.S. Pat. No. 7,804,056

Non-Patent Literature

[Non-Patent Publication 1]
J. Aloimonos, I. Weiss and A. Bandyopadhyay: "Active Vision", Int'l Journal of Computer Vision, vol. 1, no. 4, pp. 333.356 (1988).
[Non-Patent Publication 2]
K. Okumura, H. Oku and M. Ishikawa: "High-Speed Gaze Controller for Millisecond-order Pan/tilt Camera", Proc. of IEEE Int'l Conf. on Robotics and Automation, pp. 6186. 6191 (2011).

SUMMARY OF THE INVENTION

Technical Problem

However, with the configuration of patent literature 1 described above, the weight of members constituting the gimbal mechanism often becomes large, which is considered to make rapid change in line of sight direction difficult.

The present invention has been conceived in view of the above-described situation. A first object of the present invention is to provide a line of sight direction control device that can widen a range in which line of sight change is possible, particularly in a pan direction, and that can achieve high line of sight direction change speed. A second object of the present invention is to provide a method that is effective for the design of this device.

Solution to Problem

Means for solving the above-described problems can be described as in the following aspects.

(Aspect 1)

A line of sight direction control device, for controlling line of sight direction to be directed from an optical device toward a physical object, comprising:

a tilt direction control section and a pan direction control section, the tilt direction control section comprising a first tilt mirror and a second tilt mirror, the first tilt mirror being capable of rotation in forward and reverse directions about a first rotational axis, the second tilt mirror being capable of rotation in forward and reverse directions about a second rotational axis, the second rotational axis extending in a direction that is perpendicular to the first rotational axis, the pan direction control section comprising a pan mirror, the pan mirror being capable of rotation in forward and reverse directions about a third rotational axis, and the third rotational axis extending in a direction that is substantially parallel to a line of sight direction running from the tilt direction control section toward the pan mirror, and wherein an angle $\alpha$ formed by the pan mirror and the third rotational axis is set in a range of $0°<\alpha<90°$, the tilt direction control section is configured to be capable of scanning a line of sight direction with respect to a virtual surface formed by a rotational locus of the pan mirror, by rotating the first tilt mirror and the second tilt mirror, the tilt direction control section is configured to be capable of controlling tilt angle of the line of sight direction from the pan mirror to a physical object by rotating the first tilt mirror and the second tilt mirror, and the pan mirror is configured to be capable of controlling pan angle of the line of sight direction from the pan mirror to the physical object, by rotating about the third rotational axis.

(Aspect 2)

The line of sight direction control device of aspect 1, wherein the first rotational axis extends in a direction that is perpendicular to a normal vector of the first tilt mirror, and the second rotational axis extends in a direction that is perpendicular to a normal vector of the second tilt mirror.
(Aspect 3)

The line of sight direction control device of aspect 1 or aspect 2, wherein a position of the first rotational axis is coincident with a center of a beam of light that is incident on the first tilt mirror, and a position of the second rotational axis is coincident with a center of a beam of light that is irradiated to the second tilt mirror.
(Aspect 4)

The line of sight direction control device of any one of aspects 1 to 3, wherein a center of a region in which line of sight direction can be scanned by the tilt direction control section is coincident with the position of the third rotational axis.
(Aspect 5)

The line of sight direction control device of any one of aspects 1 to 4, further provided with a pupil shift optical system, wherein the pupil shift optical system is configured to transfer a pupil position of line of sight to the vicinity of any one of the first tilt mirror, the second tilt mirror and the pan mirror.
(Aspect 6)

A design method for a line of sight direction control device, provided with a tilt direction control section and pan direction control section, the tilt direction control section comprising a first tilt mirror and a second tilt mirror, the first tilt mirror being capable of rotation in forward and reverse directions about a first rotational axis, the second tilt mirror being capable of rotation in forward and reverse directions about a second rotational axis, the second rotational axis extending in a direction that is perpendicular to the first rotational axis, the pan direction control section comprising a pan mirror, the pan mirror being capable of rotation in forward and reverse directions about a third rotational axis, and the third rotational axis extending in a direction that is substantially parallel to a line of sight direction running from the tilt direction control section toward the pan mirror, and wherein an angle α formed by the pan mirror and the third rotational axis is set in a range of 0°<α<90°, the tilt direction control section is configured to be capable of scanning a line of sight direction with respect to a virtual surface formed by a rotational locus of the pan mirror, by rotating the first tilt mirror and the second tilt mirror, the tilt direction control section is configured to be capable of controlling tilt angle of the line of sight direction from the pan mirror to a physical object by rotating the first tilt mirror and the second tilt mirror, and the pan mirror is configured to be capable of controlling pan angle of the line of sight direction from the pan mirror to the physical object, by rotating about the third rotational axis, the design method further comprising, (a) a step of calculating shapes of the first tilt mirror, the second tilt mirror and the pan mirror using ray tracing, so that line of sight directions subjected to direction conversion by the first tilt mirror, the second tilt mirror and the pan mirror satisfy given required specifications; and (b) a step of searching for design parameters for the first tilt mirror, the second tilt mirror and the pan mirror by optimizing evaluation functions of the first tilt mirror, the second tilt mirror and the pan mirror, with the search here being carried out with the fact that there is no collision between the first tilt mirror, the second tilt mirror and the pan mirror as a limiting condition.
(Aspect 7)

The design method of aspect 6, wherein a limiting condition is further that after line of sight that was directed towards the pan mirror from the tilt direction control section has been reflected at the pan mirror, it does not strike the first tilt mirror or the second tilt mirror.
(Aspect 8)

The design method of aspect 6 or aspect 7, wherein the evaluation functions used in previously described step (b) are for acquiring maximum value of minimum acceleration achievable for the first tilt mirror, the second tilt mirror and the pan mirror.
(Aspect 9)

A computer program for causing execution, on a computer, of each of the steps of the design method of any one of aspects 6 to 8.

This computer program can be stored in a suitable storage medium (for example, an optical storage medium such as CD-ROM or DVD disc, electromagnetic storage medium such as a hard disk or flexible disk, or a magnetooptical storage medium such as MO disk). This computer program can also be transmitted by means of a communication network such as the Internet.

Advantageous Effect of the Invention

According to the present invention, it is possible to widen a turning range of a pan mirror, and as a result it is possible to widen the range in which line of sight can be changed in a pan direction. Further, a basic structure is the same as that of a Saccade mirror, which means that it is possible to achieve high line of sight change speed. Also, according to the design method of the present invention, it is possible to carry out design of this line of sight change control device.

DESCRIPTION OF THE EMBODIMENTS

A line of sight direction control device of one embodiment of the present invention will be described in the following with reference to the attached drawings.
(Structure of this Embodiment)

The line of sight direction control device of this embodiment is a device for controlling line of sight direction of a camera 100, as one example of an optical instrument. However, the optical instrument is not limited to an image taking device such as a camera, and may also be a projector for projecting images. The direction of travel of a light beam is reversed between an image forming device and a projector device, but it can be understood that the line of sight direction of this embodiment is the same for either case.

Figure 1:
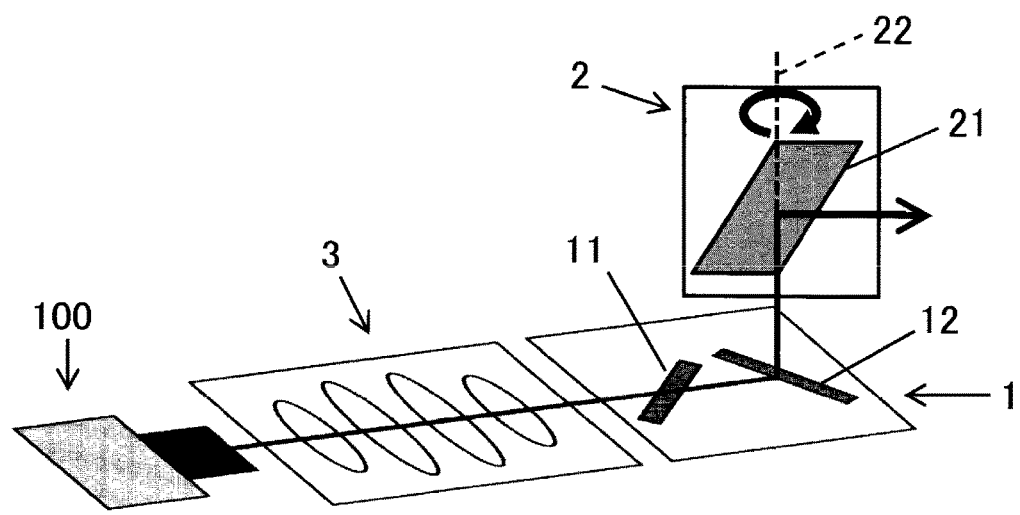
FIG. 1 is an explanatory drawing showing the schematic structure of a line of sight direction control device of one embodiment of the present invention.

The line of sight direction control device of this embodiment comprises a tilt direction control section 1, a pan direction control section 2 and a pupil shift optical system 3 (refer to FIG. 1).

(Tilt Direction Control Section)

The tilt direction control section 1 has a first tilt mirror 11 and a second tilt mirror 12. The first tilt mirror 11 is capable of being turned in the forward and reverse directions about a first rotational axis 13, by a drive mechanism, not shown (refer to FIG. 2). In more detail, with this embodiment the first rotational axis 13 extends in a direction that is perpendicular to a normal vector of the first tilt mirror 12. That is, the first rotational axis 13 is essentially arranged at a position along the reflecting surface of the first tilt mirror 11. Further, with this embodiment, the position of the first rotational axis 13 coincides with a center of a light beam that is irradiated to the first tilt mirror 11.

Figure 2:
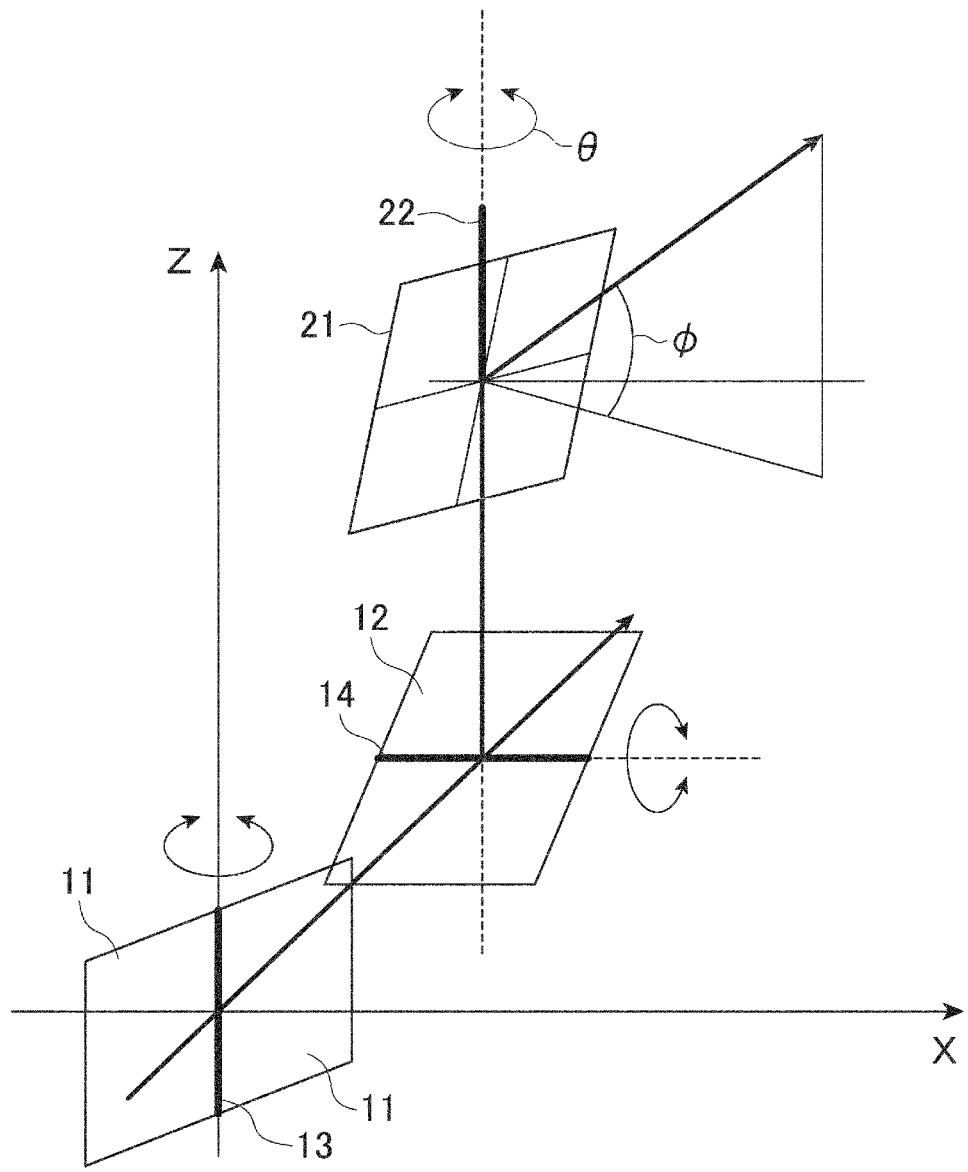
FIG. 2 is an explanatory drawing with main parts of the device of FIG. 1 enlarged.

The second tilt mirror 12 is capable of being turned in the forward and reverse directions about a second rotational axis 14, by a drive mechanism, not shown (refer to FIG. 2). The second rotational axis 14 extends in a direction that is perpendicular to a normal vector of the second tilt mirror 12. That is, the second rotational axis 14 is essentially arranged at a position along the reflecting surface of the second tilt mirror 12. Further, in this embodiment, the position of the second rotational axis 14 coincides with a center of a light beam that is irradiated to the second tilt mirror 12.

Here, unless specifically stated, the rotation axes of this embodiment may include a virtual rotational axis formed using a link mechanism, for example. It should be noted that in FIG. 2, each rotational axis has been described as appearing on a reflecting surface of each of the mirrors, but this is merely in order to simplify understanding, and in actual fact each rotational axis may be arranged at a position that does not interfere with reflection of the light beam by the mirror (for example directly behind the reflecting surface).

The second rotational axis 14 extends in a direction perpendicular to the first rotational axis 13. Perpendicular here means that an angle formed by direction vectors of each of the axes is a right angle (namely that a scalar product of the vectors is 0), and it is not necessary for each of the axes to actually cross. Also, the term right angle here includes cases where it is almost a right angle, to the extent that there is no practical problem, and does not need to be a right angle with the precise mathematical meaning.

The tilt direction control section 1 is configured to be capable of scanning a line of sight direction with respect to a virtual surface formed by a rotational locus of the pan mirror 21, which will be described later, by turning the first tilt mirror 11 and the second tilt mirror 12. Further, the tilt direction control section 1 is configured to be able to control tilt angle of a line of sight direction by causing turning of the first tilt mirror 11 and the second tilt mirror 12. Further, with this embodiment, a center of a region in which scanning of the line of sight direction by the tilt direction control section 1 is possible is made to coincide with a position of the third rotational axis 22, which will be described later (namely, close to an attachment position of the pan mirror to the third rotational axis).

(Pan Direction Control Section)

The pan direction control section 2 is provided with a pan mirror 21. The pan mirror 21 is capable of being turned in the forward and reverse directions about a third rotational axis 22, by a drive mechanism, not shown (refer to FIG. 2).

A range in which the pan mirror 21 can turn is not particularly restricted, but it can be configured to turn through 360° (namely, all around) as required. However, it may be configured just to be capable of turning through a required range. It should be noted that in FIG. 2 a pan angle is represented by the symbol θ and a tilt angle is represented by the symbol φ.

The third rotational axis 22 extends in a direction that is substantially parallel to a line of sight direction from the tilt direction control section 1 towards the pan mirror 21. Here, the line of sight direction is an entirely virtual direction, and need not be the same as a direction of travel of an actual light beam. For example, in a case where an optical instrument 100 is an imaging device, reflected light from a subject travels from the pan direction control section 2 towards the tilt direction control section 1, but a direction from the tilt direction control section 1 to the pan direction control section 2 can be considered to be a line of sight direction.

Figure 3:
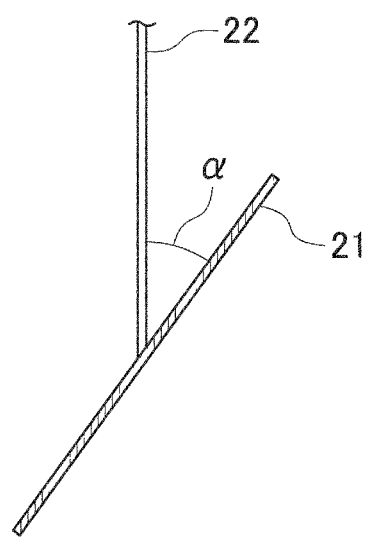
FIG. 3 is a schematic cross sectional drawing of a pan mirror, for describing a state where the pan mirror is mounted so as to rotate about a third rotational axis.

An angle α between the pan mirror 21 and the third rotational axis 22 (refer to FIG. 3) is set in a range of 0°<α<90°. Specifically, the pan mirror 21 is installed in a direction that is inclined with respect to the third rotational axis 22.

The pan mirror 21 is capable of controlling pan angle of the line of sight direction by being turned about the third rotational axis 22.

(Pupil Shift Optical System)

The pupil shift optical system 3 is configured to transfer a pupil position of line of sight to the vicinity of any one of the first tilt mirror 11, the second tilt mirror 12 and the pan mirror 21. The pupil shift optical system 3 can basically be configured in the same way as a conventional Saccade mirror, and so detailed description is omitted. Also, in this embodiment, a rotation angle of each mirror is controlled by feedback using camera images, but a conventional method can basically be used for this feedback control, and so detailed description is omitted.

(Operation of this Embodiment)

Next, operation of the line of sight direction control device of the previously described embodiment will be described. Basic usage for the line of sight direction control device of this embodiment is the same as for the "Saccade mirror" described in non-patent publication 2 described previously, for example. However, with a conventional Saccade mirror, pan angle and tilt angle are controlled using two mirrors. Conversely, with the device of this embodiment basically three mirrors (two tilt mirrors and a single pan mirror) are used, and it is possible to control tilt angle with the two tilt mirrors and control pan angle with the pan mirror.

Specifically, with this embodiment, line of sight from an optical instrument 100 passes through the pupil shift optical system 3 and reaches the first tilt mirror 11 of the tilt direction control section 1. Line of sight that has been reflected at the first tilt mirror 11 is further reflected by the second tilt mirror 12, and reaches the pan mirror 21 of the pan direction control section 2. With this embodiment, by turning the first tilt mirror 11 and the second tilt mirror 12 about the first rotational axis 13 and the second rotational axis 14, it is possible to control line of sight direction and position that will be incident on the pan mirror 21. In this way it is possible to carry out tilt angle control with this embodiment. Naturally, although it is also possible to control pan angle to a certain extent by controlling the direction of each of the mirrors of the tilt direction control section 1, with this embodiment, in order to simplify the design, the tilt direction control section 1 is used for tilt angle control.

Further, with this embodiment, since line of sight direction is controlled using at least two tilt mirrors, it is possible to scan the line of sight direction in a given range within a two-dimensional plane. Therefore, according to this embodiment, it is possible to have the line of sight direction directed on a movement locus of the pan mirror 21 that rotates about the third rotational axis 22, and control of the line of sight direction using the pan mirror 21 becomes possible.

As a result of the incident line of sight being reflected by the pan mirror 21, it is possible to direct the line of sight to a physical object. Also, with this embodiment, it is possible to control pan angle θ by rotating the pan mirror 21 about the third rotational axis 22. With a conventional Saccade mirror there was a problem in that widening the pan angle was difficult. With this embodiment however, the pan mirror 21 is theoretically rotatable through a full 360°, and so it is possible to enlarge the pan angle θ more than with the conventional case. Obviously having a pan angle such that line of sight from the tilt direction control section 1 is again returned to the tilt direction control section 1 could be considered practically inconvenient, and so a practically useful pan angle θ will often be smaller than 360° in actual fact.

Also, with this embodiment, since the first rotational axis 13 extends in a direction that is perpendicular to a normal vector of the first tilt mirror 11, and the second rotational axis 14 extends in a direction that is perpendicular to a normal vector of the second tilt mirror 12, it is possible to make moment of inertia of these mirrors small, resulting in an advantage that high-speed movement of the mirror becomes possible.

Also with this embodiment, since the position of the first rotational axis 13 coincides with the center of a light beam that is irradiated to the first tilt mirror 11, and position of the second rotational axis 14 is coincident with the center of a light beam that is irradiated to the second tilt mirror 12. This structure also makes it possible to make moments of inertia of these mirrors small, and high-speed movement of the mirrors becomes possible.

Also with this embodiment, since the center of a region in which scanning of the line of sight direction by the tilt direction control section 1 is possible is made coincident with the position of the third rotational axis 22, it becomes possible to minimize the required rotation angle for scanning of each tilt mirror, and this point also makes it possible to make the moment of inertia of each tilt mirror small.

Further, the pupil shift optical system 3 of this embodiment is configured to transfer a pupil position of line of sight to the vicinity of any one of the first tilt mirror 11, the second tilt mirror 12 and the pan mirror 21, for example, to between the first tilt mirror 11 and the second tilt mirror 12. With this embodiment therefore, it becomes possible to narrowly constrict a light beam that is irradiated to each mirror, making it possible to minimize the moments of inertia of each mirror.

(Design Method of this Embodiment)

Next, one example of a method for designing the line of sight direction control device of this embodiment will be described with further reference to FIG. 4. Also, a block diagram of a design system for executing this system is shown in FIG. 5.

Figure 4:
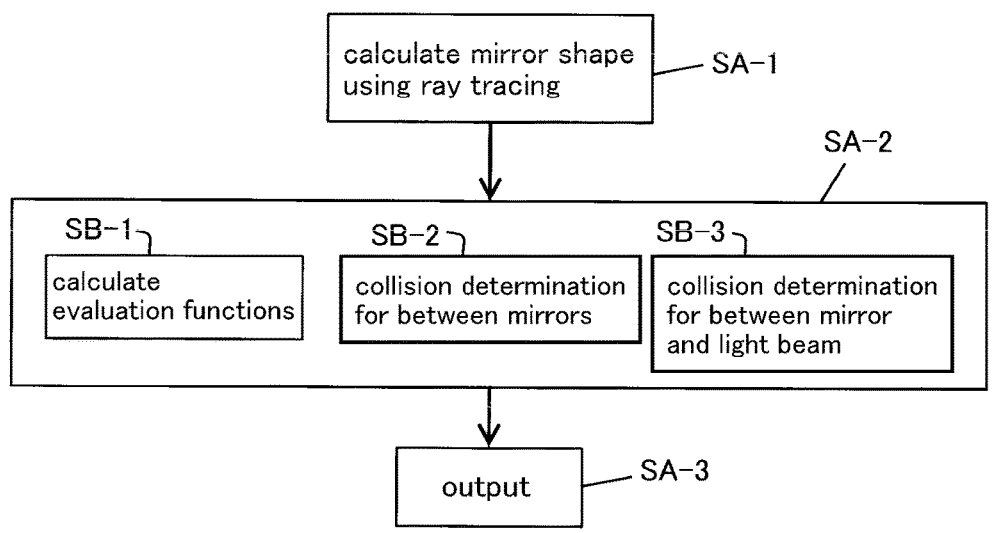
FIG. 4 is a flowchart showing a procedure for designing the line of sight direction control device of FIG. 1.
Figure 5:
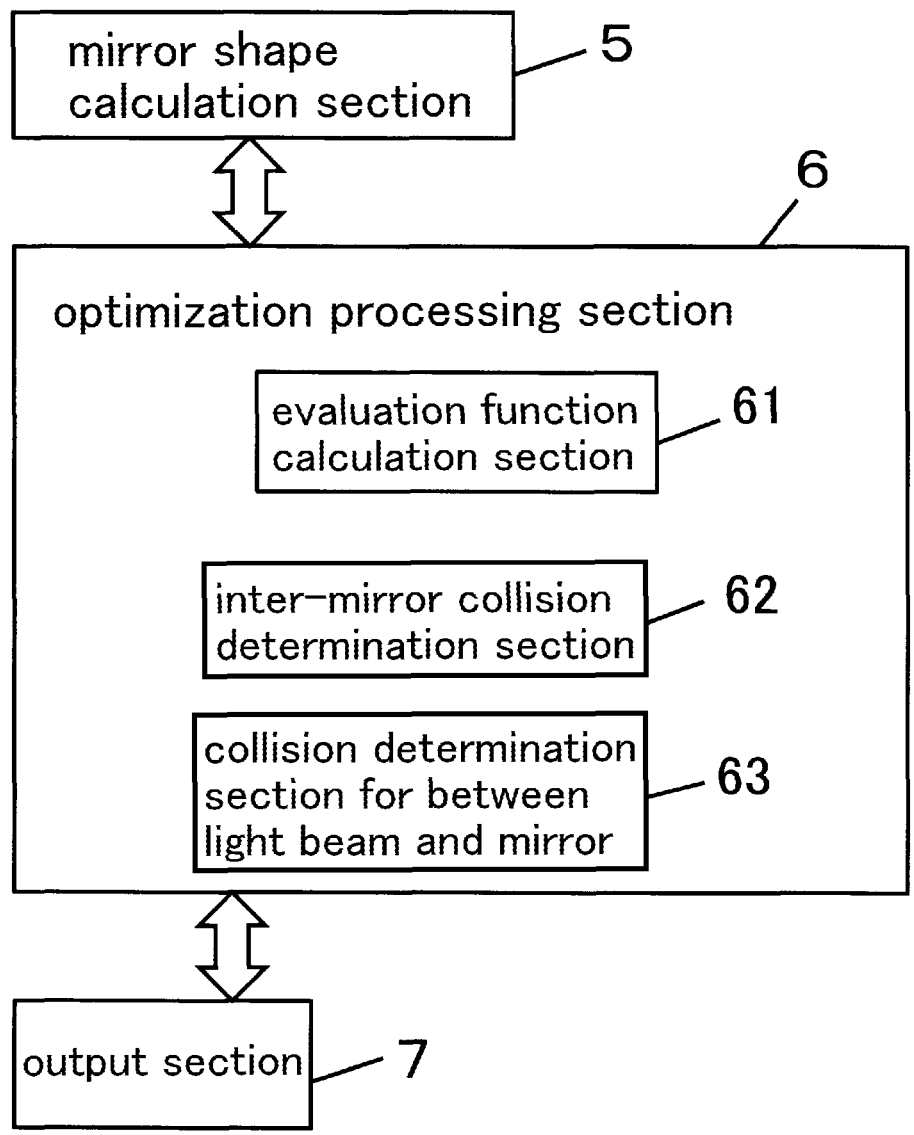
FIG. 5 is a block diagram showing one example of a design device for executing the procedure of FIG. 4.

(Step SA-1 in FIG. 4)

First, shapes of the first tilt mirror 11, second tilt mirror 12 and pan mirror 21 are calculated by the mirror shape calculation section 5 (refer to FIG. 5) using ray tracing, so that line of sight direction that is subjected to direction conversion by the first tilt mirror 11, second tilt mirror 12 and pan mirror 21 satisfies given required specifications. As prerequisites for ray tracing, it is generally necessary to provide initial values for various parameters. As these initial values, it is possible to use values that are experimentally believed to be appropriate, for example.

Here, the given required specifications are pan angle and tilt angle required by the device of this embodiment. By using ray tracing, it is possible to calculate surface area and shape required for each mirror. Ray tracing can be executed by a computer using an existing method, and so detailed description is omitted.

Line of sight direction in this embodiment can be represented using a rotation matrix as follows, $R_i$ $(\theta_i)$ (i=1, 2, 3) corresponding to each mirror (refer to FIG. 5). It should be noted here that mirror number 1 corresponds to the first tilt mirror, number 2 corresponds to the second tilt mirror and number 3 corresponds to the pan mirror. Ray tracing takes into consideration not only line of sight, but also width of a light beam that should be reflected by each mirror.

$$d = R_3(\theta_3)R_2(\theta_2)R_1(\theta_1)d_0 = R(\Theta) \quad \text{Expression 1}$$

$d \in R^3$: line of sight direction after mirror action
$d_0 \in R^3$: initial line of sight direction before mirror action $$|d| = |d_0| = 1$$

(Step SA-2 in FIG. 4)

Next, design parameters for the first tilt mirror 11, the second tilt mirror 12 and the pan mirror 21 are searched for by the optimization processing section 6 (refer to FIG. 5) by optimization using evaluation functions for the first tilt mirror 11, the second tilt mirror 12 and the pan mirror 21. This optimization processing includes the steps SB-1 to SB-3 shown in FIG. 4. These steps will be described in the following.

(Step SB-1 in FIG. 4)

First, calculation of the evaluation functions by the evaluation function calculation section 61 will be described. The evaluation functions used here are for acquiring maximum value of minimum acceleration achievable for the first tilt mirror 11, second tilt mirror 12 and pan mirror 21, for example. Specifically, the following equation can be used.

$$\operatorname*{maxmin}_i \left| \frac{d^2}{dt^2} d(\theta_i) \right|_{t=0} \quad \text{Expression 2}$$

Figure 6:
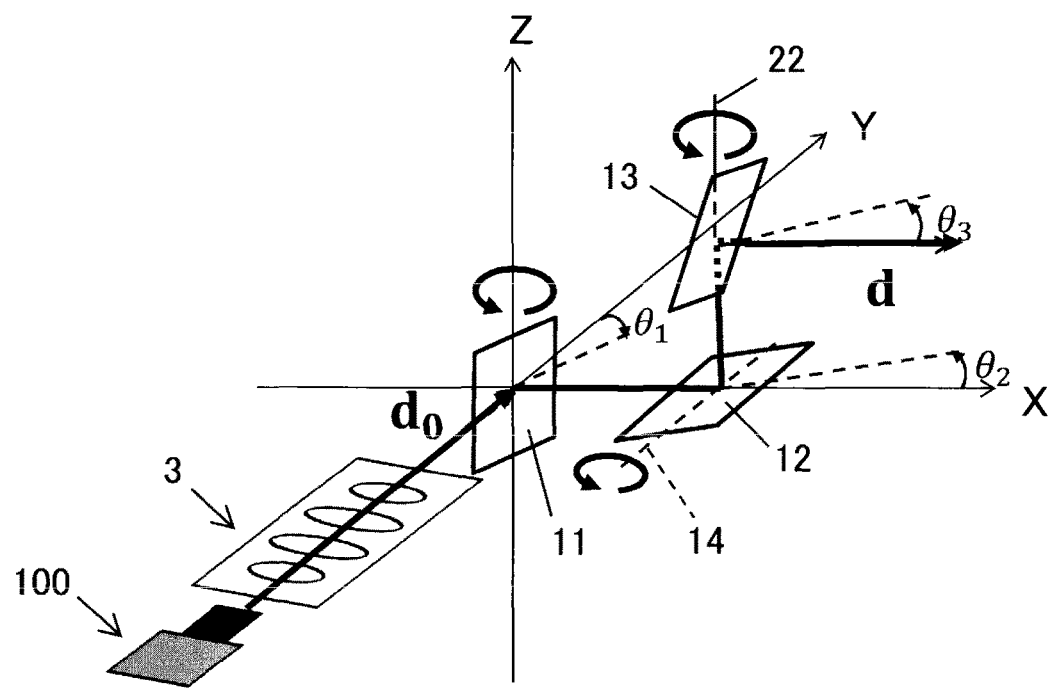
FIG. 6 is an explanatory drawing for describing change in line of sight direction using a mirror.

Here, $\theta_i$ is line of sight direction rotation angle of each mirror (refer to FIG. 6), and constitutes a function of time t. Also, d here is a vector amount representing line of sight direction after line of sight looking at the pan mirror 21 from the tilt direction control section 1 has been reflected at the pan mirror 21, and constitutes a function of $\theta_i$. Within the evaluation expression, $\min_i$ means the smallest value (minimum value) of acceleration norms at a given time t (with the previously mentioned example, t=0) for a line of sight direction d in a case where only one of the respective mirrors has been rotated at a given torque. Accordingly, with the evaluation expression overall, the aim is to carry out optimization to maximize this minimum value by changing various parameters. As parameters that are changed at the time of optimization, there are rotation angle of each mirror, inter-mirror distance, pupil position, and inclination of the pan mirror with respect to the third rotational axis. It is also possible to use an existing interior point method, for example, in the optimization (refer to H. Yamashita, "Approaching Large Sale Optimization by Way of Active Set Method, Interior Point Method and Exterior Point Method," The Institute of Systems, Control and Information Engineers, Vol. 50, No. 9, pp. 332-337, 2006.).

Here, retrieval of design parameters by using the evaluation expressions is further carried out within a range of constraint conditions in the following steps SB-2 to SB-3. This will be described further in the following.

(Step SB-2 in FIG. 4)

Here, in calculation of the evaluation functions, the inter-mirror collision detection section 62 establishes the following conditions as a constraint function.

Expression 3

$$c_1, c_2 = \begin{cases} \text{collision value} > 0 \text{(when there is collision between mirrors)} \\ \text{shortest inter-mirror distance } X(-1) \\ \text{(when there is no collision between mirrors)} \end{cases}$$

Here, $c_{1,2} \leq 0$ is made a constraint condition. By establishing this condition, the previously described optimization (namely selection of various parameters) is carried out with the fact that there is no collision between the first tilt mirror 11, the second tilt mirror 12 and the pan mirror 21 as a constraint condition.

(Step SB-3 in FIG. 4)

In the calculation of the evaluation functions of this embodiment, the light beam/inter-mirror collision detection section 63 further establishes the following condition as a constraint function.

Expression 4

$$c_3 = \begin{cases} \text{collision value} > 0 \text{(when light beam contacts tilt mirror)} \\ \text{shortest distance between light beam and mirror } X(-1) \\ \text{(when light beam does not contact tilt mirror)} \end{cases}$$

Here $c_3 \leq 0$ is made a constraint condition. By establishing this constraint, the previously described optimization is carried out with "a light beam that was directed from the tilt direction control section 1 towards the pan mirror 21 does not strike the first tilt mirror 11 or the second tilt mirror 12 after being reflected at the pan mirror 21" as a constraint condition. Here, the light beam spreads over a range that is wider than the line of sight, and the widening can be calculated from the design parameters. Also, the light beam here is hypothetical and a matter of design. A light beam that is incident on the camera 100 of this embodiment advances from the pan direction control section 2 towards the tilt direction control section 1, but on design a light beam may also be assumed to advance in the reverse direction. Each step of the design method of this embodiment can be executed by being implemented as a computer program.

(Step SA-3 in FIG. 4)

Next, the output section 7 outputs design conditions that have been acquired by optimization (specifically, respective parameters). Output is to a printer or display, for example, but may also be to a storage medium on a computer.

The content of the present invention is not limited to each of the described embodiments. Various modifications are possible to the specific structure of the present invention, within the scope described in the patent claims.

For example, each of the above-described structural elements can exist as a functional block, and does not need to exist as independent hardware. Also, as a method of implementation, it is possible to use hardware or to use computer software. Further, a single functional element of the present invention may be realized as a set of a plurality of functional elements, and a plurality of functional elements of the present invention may be implemented by a single functional element.

Also, functional elements may be located at positions that are physically separated from one another. In this case, associated functional elements may be connected by means of a network. Functions may be realized by means of grid computing or cloud computing, and alternatively functional elements may also be constituted.

Further, with the previously described embodiment, a total of three mirrors are used, namely the two tilt mirrors and the single pan mirror, but it is also possible to use a greater number of mirrors. The fewer mirrors that are used, the simpler the control becomes.

The invention claimed is:

1. A line of sight direction control device for controlling line of sight direction to be directed from an optical device toward a physical object, comprising:
   a tilt direction control section and a pan direction control section,
   the tilt direction control section comprising a first tilt mirror and a second tilt mirror, wherein:
      the first tilt mirror is rotatable by a drive mechanism in forward and reverse directions about a first rotational axis,
      the second tilt mirror is rotatable by a drive mechanism in forward and reverse directions about a second rotational axis, and
      the second rotational axis extends in a direction that is perpendicular to the first rotational axis,
   the pan direction control section comprising a pan mirror having a rotational axis member disposed on a backside of the pan mirror, wherein:
      the pan mirror is rotatable by a drive mechanism coupled to the rotational axis member, in forward and reverse directions about a third rotational axis, and
      the rotational axis member extends from the backside of the pan mirror along the third rotational axis in a direction that is parallel to a line of sight direction running from the second tilt mirror of the tilt direction control section toward the pan mirror, and
   wherein:
      the pan mirror is installed in a direction that is inclined with respect to the rotational axis member,
      the tilt direction control section scans a line of sight direction with respect to a virtual surface formed by a rotational locus of a front side of the pan mirror, by rotating the first tilt mirror and the second tilt mirror,
      the tilt direction control section controls a tilt angle of the line of sight direction from the front side of the pan mirror to a physical object by rotating the first tilt mirror and the second tilt mirror,
      the pan direction control section controls a pan angle of the line of sight direction from the front side of the pan mirror to the physical object, by rotating the pan mirror about the rotational axis member, and
      the line of sight direction control device further comprises a pupil shift optical system, and the pupil shift optical system transfers a pupil position of line of sight to the vicinity of any one of the first tilt mirror, the second tilt mirror, and the pan mirror.

2. The line of sight direction control device of claim 1, wherein the first rotational axis extends in a direction that is perpendicular to a normal vector of the first tilt mirror, and the second rotational axis extends in a direction that is perpendicular to a normal vector of the second tilt mirror.

3. The line of sight direction control device of claim 1, wherein a position of the first rotational axis is coincident with a center of a beam of light that is incident on the first tilt mirror, and a position of the second rotational axis is coincident with a center of a beam of light that is irradiated to the second tilt mirror.

4. The line of sight direction control device of claim 1, wherein a center of a region in which line of sight direction can be scanned by the tilt direction control section is coincident with a position of the third-rotational axis member.

5. A design method for a line of sight direction control device, provided with a tilt direction control section and pan direction control section, wherein:

the tilt direction control section comprises a first tilt mirror and a second tilt mirror, the first tilt mirror is rotatable by a drive mechanism in forward and reverse directions about a first rotational axis, the second tilt mirror is rotatable by a drive mechanism in forward and reverse directions about a second rotational axis, the second rotational axis extends in a direction that is perpendicular to the first rotational axis, the pan direction control section comprises a pan mirror having a rotational axis member disposed on a back side of the pan mirror, the pan mirror is rotatable by a drive mechanism coupled to the rotational axis member, in forward and reverse directions about a third rotational axis, and the rotational axis member extends from the backside of the pan mirror along the third rotational axis in a direction that is substantially parallel to a line of sight direction running from the second tilt mirror of the tilt direction control section toward the pan mirror, and wherein:

the pan mirror is installed in a direction that is inclined with respect to the rotational axis member, an angle α formed by the pan mirror and the rotational axis member is set in a range of 0°<α<90°, the tilt direction control section scans a line of sight direction with respect to a virtual surface formed by a rotational locus of a front side of the pan mirror, by rotating the first tilt mirror and the second tilt mirror, the tilt direction control section controls a tilt angle of the line of sight direction from the front side of the pan mirror to a physical object by rotating the first tilt mirror and the second tilt mirror, the pan mirror controls a pan angle of the line of sight direction from the front side of the pan mirror to the physical object, by rotating about the rotational axis member, and the line of sight direction control device further comprises a pupil shift optical system, and the pupil shift optical system transfers a pupil position of line of sight to the vicinity of any one of the first tilt mirror, the second tilt mirror, and the pan mirror, the design method further comprising, (a) a step of calculating shapes of the first tilt mirror, the second tilt mirror, and the pan mirror using ray tracing, so that line of sight directions subjected to direction conversion by the first tilt mirror, the second tilt mirror, and the pan mirror satisfy given required specifications; and (b) a step of searching for design parameters for the first tilt mirror, the second tilt mirror, and the pan mirror by optimizing evaluation functions of the first tilt mirror, the second tilt mirror, and the pan mirror, with the search for deign parameters being carried out with the fact that collision does not occur between the first tilt mirror, the second tilt mirror, and the pan mirror as a constraint condition.

6. The design method of claim 5, wherein a constraint condition is further that after line of sight that was directed towards the pan mirror from the tilt direction control section has been reflected at the pan mirror, the line of sight does not strike the first tilt mirror or the second tilt mirror.

7. The design method of claim 5, wherein the evaluation functions used in previously described step (b) are for acquiring maximum value of minimum acceleration achievable for the first tilt mirror, the second tilt mirror and the pan mirror.

8. A non-transitory computer readable medium having computer-executable instructions stored thereon, wherein in response to execution of the instructions by a computer, the computer performs each of the steps of the design method for the line of sight direction control device of claim 5.

9. The line of sight direction control device of claim 1, wherein a range in which the pan mirror can rotate is set substantially 360° about the rotational axis member on the backside of the pan mirror.

\* \* \* \* \*

UNITED STATES PATENT AND TRADEMARK OFFICE
CERTIFICATE OF CORRECTION

PATENT NO. : 10,481,381 B2
APPLICATION NO. : 14/902996
DATED : November 19, 2019
INVENTOR(S) : Hiromasa Oku et al.

Page 1 of 1

It is certified that error appears in the above-identified patent and that said Letters Patent is hereby corrected as shown below:

In the Claims

Column 11, Line 18:
"coincident with a position of the third-rotational axis member." should read, --coincident with a position of the rotational axis member.--

Signed and Sealed this
Eighteenth Day of August, 2020

Andrei Iancu
*Director of the United States Patent and Trademark Office*